United States Patent
Ogawa et al.

(10) Patent No.: US 10,777,827 B2
(45) Date of Patent: Sep. 15, 2020

(54) WATER DRAINAGE DEVICE FOR FUEL CELL, FUEL CELL SYSTEM, MOVING BODY AND CONTROL METHOD OF FUEL CELL SYSTEM

(71) Applicant: TOYOTA JIDOSHA KABUSHIKI KAISHA, Toyota-shi, Aichi-ken (JP)

(72) Inventors: Tomohiro Ogawa, Toyota (JP); Ryosuke Oya, Toyota (JP); Tomohiko Kaneko, Okazaki (JP); Mitsuhiro Nada, Toyota (JP); Yoshiaki Naganuma, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 924 days.

(21) Appl. No.: 14/937,321

(22) Filed: Nov. 10, 2015

(65) Prior Publication Data

US 2016/0141671 A1    May 19, 2016

(30) Foreign Application Priority Data

Nov. 14, 2014    (JP) .................................. 2014-231175

(51) Int. Cl.
*H01M 8/00* (2016.01)
*H01M 8/04119* (2016.01)

(52) U.S. Cl.
CPC .... *H01M 8/04179* (2013.01); *H01M 2250/20* (2013.01); *Y02T 90/32* (2013.01)

(58) Field of Classification Search
CPC ............... H01M 8/04; H01M 8/04291; H01M 8/04298; H01M 8/04082; H01M 8/04179;
(Continued)

(56) References Cited

U.S. PATENT DOCUMENTS

| 7,989,112 B2 * | 8/2011 | Murakami ........ H01M 8/04007 429/428 |
| 2006/0068240 A1 | 3/2006 | Matoba |

(Continued)

FOREIGN PATENT DOCUMENTS

| JP | 2006-99994 | 4/2006 |
| JP | 2007-048650 A | 2/2007 |

(Continued)

*Primary Examiner* — Nicholas P D'Aniello
(74) *Attorney, Agent, or Firm* — Finnegan, Henderson, Farabow, Garrett & Dunner, LLP (57) ABSTRACT

A technique that suppresses excessive water drainage from a fuel cell is provided. A water drainage device that drains water from inside of a fuel cell includes: a purge gas supply system; an operation unit; a water drainage controller; and a water content acquirer. The operation unit receives a water drainage command from a water drainage switch configured to control execution of a purge process by the purge gas supply system. When the water content obtained by the water content acquirer is equal to or lower than a predetermined value, the water drainage controller performs either one of: (i) invalidating the received water drainage command; and (ii) changing a processing condition of the purge process to decrease an amount of water drained by the purge process, compared with an amount of water drainage when the obtained water content is higher than the predetermined value.

13 Claims, 8 Drawing Sheets

(58) Field of Classification Search
CPC ............... H01M 8/00; H01M 8/04828; H01M 8/04843; H01M 8/04223; H01M 8/04156
USPC ........................................................ 429/414
See application file for complete search history.

(56) References Cited

U.S. PATENT DOCUMENTS

| | | | |
|---|---|---|---|
| 2010/0221630 A1 | 9/2010 | Kajiwara et al. | |
| 2010/0255396 A1 | 10/2010 | Kajiwara et al. | |
| 2012/0214077 A1* | 8/2012 | Garrettson | H01M 8/04014 |
| | | | 429/429 |
| 2015/0214561 A1 | 7/2015 | Araki et al. | |

FOREIGN PATENT DOCUMENTS

| | | |
|---|---|---|
| JP | 2007-128778 A | 5/2007 |
| JP | 2008-74200 | 4/2008 |
| JP | 2009-87821 A | 4/2009 |
| JP | 2009-110665 A | 5/2009 |
| JP | 2009-129793 A | 6/2009 |
| JP | 2009-148709 A | 7/2009 |
| JP | 2010-40283 A | 2/2010 |
| JP | 2010-108756 A | 5/2010 |
| WO | WO 2013/132536 A1 | 9/2013 |

\* cited by examiner

WATER DRAINAGE DEVICE FOR FUEL CELL, FUEL CELL SYSTEM, MOVING BODY AND CONTROL METHOD OF FUEL CELL SYSTEM

CROSS-REFERENCE TO RELATED APPLICATIONS

The present application claims priority from Japanese patent application (JP) 2014-231175 filed on Nov. 14, 2014, the entirety of disclosure of which is hereby incorporated by reference into this application.

BACKGROUND

Field

The present invention relates to a water drainage device for fuel cell, a fuel cell system, a moving body and a control method of the fuel cell system.

Related Art

During operation of a polymer electrolyte fuel cell, hereinafter simply referred to as "fuel cell", a large amount of water produced by electrochemical reaction is generally drained. A variety of techniques have been proposed with regard to a method of draining water from a fuel cell in a moving body equipped with the fuel cell, as disclosed in JP 2006-099994A and JP 2008-074200A for example.

In a fuel cell system including a fuel cell, one proposed technique drains water from inside of the fuel cell by purging. The purge process, however, has a problem that water is excessively drained from inside of the fuel cell to deteriorate the power generation performance of the fuel cell. There is a still a room for improvement to prevent potential trouble caused by a water drainage process of draining water from inside of the fuel cell.

SUMMARY

In order to solve at least part of the above problems, the invention may be implemented by any of the following aspects.

(1) According to a first aspect of the present invention, there is provided a water drainage device for fuel cell that drains water from inside of a fuel cell. The water drainage device of this aspect may comprise a purge gas supply system, an operation unit, a water drainage controller and a water content acquirer. The purge gas supply system may be configured to supply a gas to the fuel cell for purging out water from inside of the fuel cell. The operation unit may be configured to receive a water drainage command from a user. The water drainage controller may be configured to perform a purge process of purging inside of the fuel cell to drain water from the fuel cell by controlling the purge gas supply system, when receiving the water drainage command via the operation unit. The water content acquirer may be configured to obtain a water content representing an amount of water included in the fuel cell. The water drainage controller may control the purge process according to the obtained water content. When the obtained water content is equal to or lower than a predetermined value, the water drainage controller may perform either one of: (i) a process of invalidating the water drainage command received by the operation unit; and (ii) a process of changing a processing condition of the purge process to decrease an amount of water drained by the purge process, compared with an amount of water drainage when the obtained water content is higher than the predetermined value. The water drainage device of this aspect suppresses inside of the fuel cell from being excessively dried due to the purge process.

(2) In the water drainage device of the above aspect, the water drainage controller may terminate the purge process, when receiving an operation that is identical with an operation to give the water drainage command via the operation unit during the purge process. The water drainage device of this aspect enables water to be drained from inside of the fuel cell at any timing selected by the user, while allowing the user to cancel the water drainage command by an intuitive operation. This accordingly enhances the usability in the water drainage device or a fuel cell system including the water drainage device.

(3) The water drainage device of the above aspect may further comprise a notifier that is configured to notify the user of an execution state of the purge process. The water drainage device of this aspect notifies the user of the execution state of the purge process. This ensures the high usability.

(4) The water drainage device of the above aspect may further comprise an environment information acquirer that is configured to obtain environment information regarding an environment condition in which the fuel cell is placed. The water drainage controller may change a processing condition of the purge process according to the obtained environment information. The water drainage device of this aspect enables the water drainage process to be adequately performed according to the environment in which the fuel cell is placed.

(5) According to a second aspect of the present invention, there is provided a fuel cell system. The fuel cell system of this aspect may comprise a fuel cell, the water drainage device of any of the above aspect, and a system controller that is configured to control operation of the fuel cell and serve as the water drainage controller of the water drainage device. The system controller may control the purge gas supply system to perform the purge process which is to be performed, when receiving the water drainage command via the operation unit, as a forced purging process. The system controller may control the purge gas supply system to perform a post-stop purging process of purging inside of the fuel cell after stop of operation of the fuel cell, in addition to the forced purging process. The fuel cell system of this aspect allows the user to arbitrarily reduce the water content inside of the fuel cell by the forced purging process prior to the post-stop purging process. This reduces the amount of water drainage in the post-stop purging process.

(6) The fuel cell system of the above aspect may further comprise an environment information acquirer that is configured to obtain environment information regarding an environment condition in which the fuel cell is placed. The system controller may change a processing condition of the forced purging process and a processing condition of the post-stop purging process according to the environment information obtained by the environment information acquirer. The fuel cell system of this aspect enables the water drainage process to be adequately performed according to the environment in which the fuel cell is placed. The fuel cell system of this aspect changes both the processing condition of the post-stop purging process and the processing condition of the forced purging process. Despite the change of the processing condition according to the environment in which the fuel cell is placed, this ensures the effect of reducing the amount of water drainage in the post-stop purging process by performing the forced purging process in advance.

(7) According to a third aspect of the present invention, there is provided a moving body that comprises a fuel cell mounted thereon as an electric power source and a fuel gas tank. The moving body of this aspect may be equipped with the fuel cell system of any of the above aspect. The moving body of this aspect enhances the controllability of the water drainage process of the fuel cell and prevents potential trouble caused by the water drainage process.

All the plurality of components included in each of the aspects of the present invention described above are not essential, but some components among the plurality of components may be appropriately changed, omitted or replaced with other components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the present invention described above may be combined with part or all of the technical features included in another aspect of the present invention described above to provide still another independent aspect of the present invention.

The invention may be implemented by any of various aspects other than the aspects of the water drainage device, the fuel cell system and the moving body described above. The invention may be implemented by, for example, a purge device or a purge system that is configured to purge inside of the fuel cell, a method of draining water from a fuel cell, a purge method, a control method of water drainage process, a control method of purge process, computer programs that implement these methods and a non-transitory storage media in which such computer programs are stored.

DESCRIPTION OF THE EMBODIMENTS

A. First Embodiment

A1. Configuration of Fuel Cell System

Figure 1:
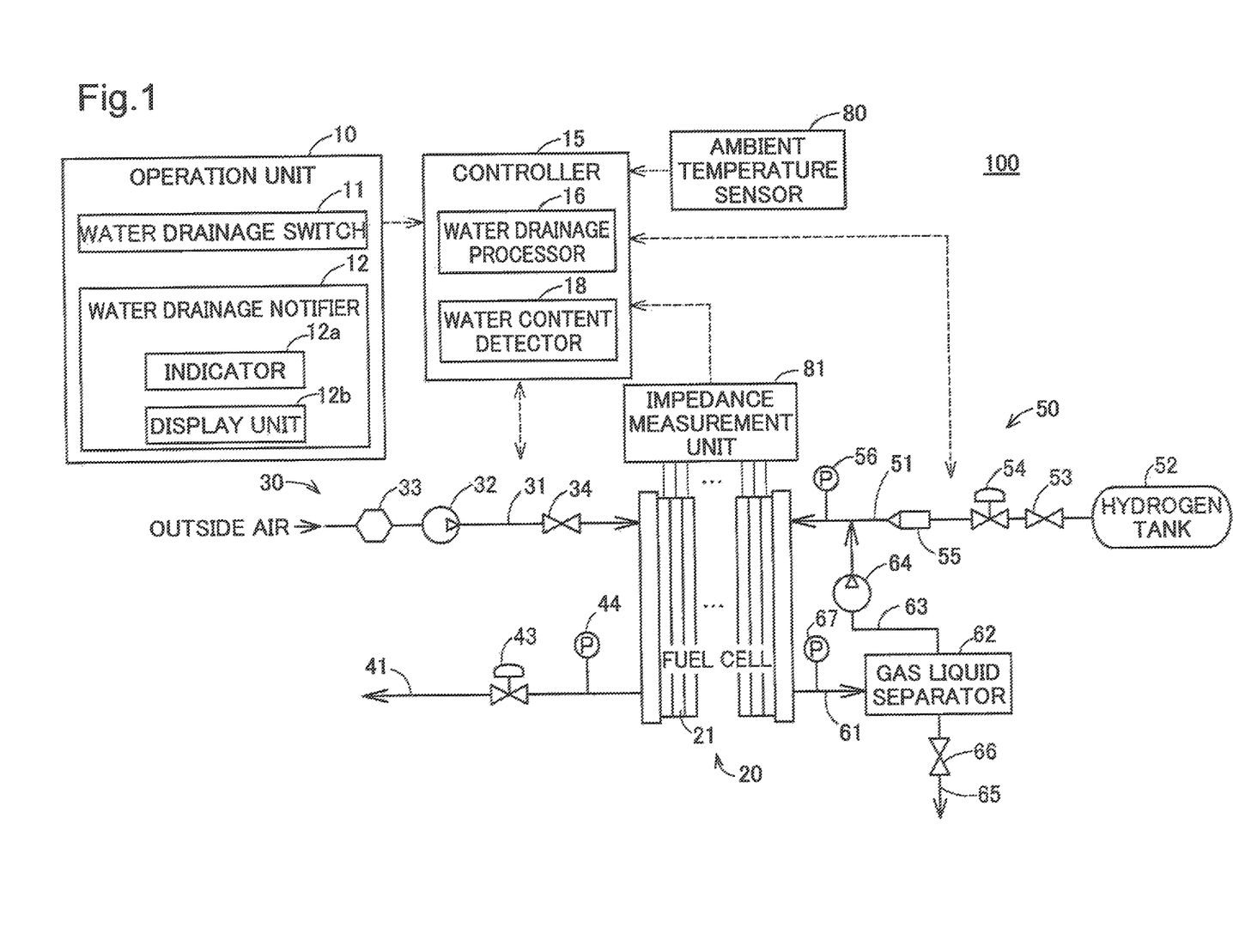
FIG. 1 is a schematic diagram illustrating the configuration of a fuel cell system.

FIG. 1 is a schematic diagram illustrating the configuration of a fuel cell system 100 according to a first embodiment of the present invention. This fuel cell system 100 is mounted on a fuel cell vehicle to output electric power used as the driving force in response to a request from a user or a driver. The fuel cell system 100 includes an operation unit 10, a controller 15, a fuel cell 20, a cathode gas supply system 30 and an anode gas supply system 50.

The operation unit 10 is provided at a cockpit in the fuel cell vehicle and is configured to receive an operation from a driver and send a signal representing the operation to the controller 15. The operation unit 10 receives operations for specifying the driving speed of the fuel cell vehicle or more specifically operations of an accelerator pedal and a brake pedal (not shown) provided at the cockpit, as an output request to the fuel cell system 100. The operation unit 10 includes a water drainage switch 11 and a water drainage notifier 12.

The water drainage switch 11 is provided in an instrument panel to allow the driver to make a press during driving and is operated by the driver to receive a water drainage command that is a command to start a water drainage process which is described later. According to this embodiment, the water drainage switch 11 is provided in the form of a push button switch. The water drainage notifier 12 is also provided in the instrument panel to allow the driver to visually check during driving and is configured to notify the driver of information regarding the execution state of the water drainage process. According to this embodiment, the water drainage notifier 12 includes an indicator 12a that is lit on and off to notify of the execution state of the water drainage process and a display unit 12b that displays a message with regard to the water drainage process. The indicator 12a may be configured by, for example, an LED lamp. The display unit 12b may be configured by, for example, a liquid crystal display or an LED display. The operation of the water drainage switch 11 and the notification process of the water drainage notifier 12 will be described later.

The controller 15 working as a processor is configured by a microcomputer including a central processing unit and a main storage unit. The controller 15 reads and executes a program on the main storage unit to exert various functions. The controller 15 corresponds to the subordinate concept of the system controller of the present invention and serves as a power generation controller to control the respective components of the fuel cell system 100 and cause the fuel cell 20 to generate electric power in response to the output request. The controller 15 also has the functions of a water drainage processor 16 and a water content detector 18. The water drainage processor 16 performs the water drainage process to drain water from the fuel cell 20. The water drainage processor 16 corresponds to the subordinate concept of the water drainage controller of the present invention. The water drainage control performed by the water drainage processor 16 will be described later. The water content detector 18 detects the water content indicating the amount of water included in the fuel cell 20 and outputs the detection result to the water drainage processor 16. Details about the water content detector 18 will be described later.

The fuel cell 20 is configured as a polymer electrolyte fuel cell that receives supplies of hydrogen (anode gas) and the air (cathode gas) as reactive gases and generates electric power. The fuel cell 20 has stacked structure by stacking a plurality of unit cells 21. Each unit cell 21 is a power generation element that is capable of generating electric power by itself and includes a membrane electrode assembly formed as a power generation body by placing electrodes on respective surfaces of an electrolyte membrane and two separators (not shown in figure) placed across the membrane electrode assembly. The electrolyte membrane is a solid polymer membrane that shows good proton conductivity in the wet state including water content.

The cathode gas supply system 30 serves to supply the cathode gas to the fuel cell 20 and discharge water and a cathode off-gas from the cathode side of the fuel cell 20 to outside of the fuel cell system 100. The cathode gas supply system 30 includes a cathode gas piping 31, an air compressor 32, an air flowmeter 33 and an on-off valve 34, which are provided upstream of the fuel cell 20. The cathode gas piping 31 is connected with an inlet of a gas flow path on the cathode side in the fuel cell 20. The air compressor 32 is connected with the fuel cell 20 via the cathode gas piping 31 to taken in the outside air, compress the intake air and supply the compressed air as the cathode gas to the fuel cell 20.

The air flowmeter 33 is provided upstream of the air compressor 32 to measure the amount of the outside air taken in by the air compressor 32 and send the measurement value to the controller 15. The controller 15 drives the air compressor 32 based on the received measurement value to control the supply amount of the air to the fuel cell 20. The on-off valve 34 is provided between the air compressor 32 and the fuel cell 20. The on-off valve 34 is normally closed and is opened in response to supply of the air having a predetermined pressure from the air compressor 32 to the cathode gas piping 31.

The cathode gas supply system 30 also includes a cathode off-gas piping 41, a pressure regulator 43 and a pressure gauge 44, which are provided downstream of the fuel cell 20. The cathode off-gas piping 41 is connected with an outlet of the gas flow path on the cathode side in the fuel cell 20 to introduce the discharged water and the cathode off-gas to outside of the fuel cell system 100. The pressure regulator 43 regulates the back pressure on the cathode side of the fuel cell 20 that is the pressure of the cathode off-gas in the cathode off-gas piping 41. The pressure gauge 44 is provided upstream of the pressure regulator 43 to measure the pressure of the cathode off-gas and send the measurement value to the controller 15. The controller 15 adjusts the opening of the pressure regulator 43, based on the received measurement value of the pressure gauge 44.

In the water drainage process performed under the control of the water drainage processor 16, the cathode gas supply system 30 supplies a purge gas to the fuel cell 20 and performs a purge process to purge inside of the fuel cell 20. The cathode gas supply system 30 of this embodiment corresponds to the subordinate concept of the purge gas supply system of the present invention. In the purge process, in the state of stopping the supply of the anode gas to the fuel cell 20, the outside air taken in by the air compressor 32 is flowed as the purge gas through the cathode gas piping 31, inside of the fuel cell 20 and the cathode off-gas piping 41. The purge process drains water in the cathode gas flow path including inside of the fuel cell 20 out of the fuel cell system 100.

The anode gas supply system 50 serves to supply the anode gas to the fuel cell 20, discharge an anode off-gas from the fuel cell 20 to outside of the fuel cell system 100, and circulate the anode gas in the fuel cell system 100. The anode gas supply system 50 includes an anode gas piping 51, a hydrogen tank 52, an on-off valve 53, a regulator 54, a hydrogen supplier 55 and a pressure gauge 56, which are provided upstream of the fuel cell 20. The hydrogen tank 52 is filled with high-pressure hydrogen, which is to be supplied to the fuel cell 20. The hydrogen tank 52 is connected via the anode gas piping 51 with an inlet of a gas flow path on the anode side in the fuel cell 20.

The anode gas piping 51 is provided with the on-off valve 53, the regulator 54, the hydrogen supplier 55 and the pressure gauge 56 in this sequence from the hydrogen tank 52-side that is the upstream side. The controller 15 controls opening and closing of the on-off valve 53 to control the inflow of hydrogen from the hydrogen tank 52 to the upstream side of the hydrogen supplier 55. The regulator 54 is a pressure reducing valve configured to regulate the pressure of hydrogen on the upstream side of the hydrogen supplier 55, and the opening of the regulator 54 is controlled by the controller 15. The hydrogen supplier 55 may be configured by, for example, an injector that is an electromagnetically-driven on-off valve. The pressure gauge 56 measures the pressure of hydrogen on the downstream side of the hydrogen supplier 55 and sends the measurement value to the controller 15. The controller 15 controls the driving cycle, i.e., the open-close cycle, of the hydrogen supplier 55 based on the measurement value of the pressure gauge 56 to control the amount of hydrogen supplied to the fuel cell 20.

The anode gas supply system 50 also includes an anode off-gas piping 61, a gas liquid separator 62, an anode gas circulation piping 63, a hydrogen circulation pump 64, an anode drainage piping 65, a drainage valve 66 and a pressure gauge 67, which are provided downstream of the fuel cell 20. The anode off-gas piping 61 is arranged to connect an outlet of the gas flow path on the anode side in the fuel cell 20 with the gas liquid separator 62. The anode off-gas piping 61 is provided with the pressure gauge 67. The pressure gauge 67 measures the back pressure on the anode side of the fuel cell 20 that is the pressure of the anode off-gas in the vicinity of the outlet of the gas flow path on the anode side in the fuel cell 20 and send the measurement value to the controller 15. The pressure gauge 67 may be omitted as appropriate.

The gas liquid separator 62 is connected with the anode gas circulation piping 63 and the anode drainage piping 65. The anode off-gas flowing through the anode off-gas piping 61 into the gas liquid separator 62 is separated into a gas component and water by the gas liquid separator 62. In the gas liquid separator 62, the gas component of the anode off-gas is introduced to the anode gas circulation piping 63, while the water is introduced to the anode drainage piping 65.

The anode gas circulation piping 63 is connected with the anode gas piping 51 downstream of the hydrogen supplier 55. The anode gas circulation piping 63 is provided with the hydrogen circulation pump 64. The hydrogen circulation pump 64 works to feed hydrogen included in the gas component separated by the gas liquid separator 62 to the anode gas piping 51. The anode drainage piping 65 is provided with the drainage valve 66.

The drainage valve 66 is opened and closed in response to a command from the controller 15. The controller 15 normally closes the drainage valve 66 and opens the drainage valve 66 at a predetermined water drainage timing and at a discharge timing of an inert gas included in the anode off-gas. A downstream end of the anode drainage piping 65 is joined with the cathode off-gas piping 41, although not being illustrated, in order to mix the discharged water and the anode off-gas on the anode side with the discharged water and the cathode off-gas on the cathode side and discharge the mixture.

The fuel cell system 100 further includes an ambient temperature sensor 80 and an impedance measurement unit 81. The ambient temperature sensor 80 sends a signal representing the ambient temperature that the temperature outside of the fuel cell vehicle to the controller 15. The ambient temperature detected by the ambient temperature sensor 80 corresponds to the subordinate concept of the environment information showing the environment condition in which the fuel cell 20 is placed. The detection result of the ambient temperature sensor 80 is used for water drainage control by the water drainage processor 16, as described later.

The impedance measurement unit 81 is connected with each of the unit cells 21 of the fuel cell 20. The impedance measurement unit 81 employs the ac impedance method to measure the cell resistance that is the resistance of each unit cell 21 and output the measured cell resistance to the controller 15. The cell resistance is affected by the water content in each unit cell 21. The water content detector 18 obtains an estimated value based on a predefined relationship between the cell resistance and the water content in each unit cell 21, as the observed value that shows the current water content in the fuel cell 20.

Additionally, the fuel cell system 100 includes a cooling medium supply system that is configured to supply a cooling medium to the fuel cell 20 and control the operation temperature of the fuel cell 20, although the illustration and the detailed description are omitted. The fuel cell system 100 further includes a secondary battery and a DC-DC converter (not shown). The secondary battery accumulates the electric power output from the fuel cell 20 and the regenerative electric power and serves as the electric power source, along with the fuel cell 20. The DC-DC converter controls charging and discharging of the secondary battery and the output voltage of the fuel cell 20. The respective components of the fuel cell system 100 described above may be driven by using the electric power of the secondary battery even after stop of operation of the fuel cell 20.

A2. Water Drainage Process in Fuel Cell System

With reference to FIGS. 2 to 6, the following describes the water drainage process performed in the fuel cell system 100 of the embodiment. In the fuel cell system 100 of the embodiment, the water drainage process is performed by using the electric power of the secondary battery even after stop of operation of the fuel cell 20, as well as during operation of the fuel cell 20. The following sequentially describes water drainage control during operation of the fuel cell 20 and water drainage control after stop of operation of the fuel cell 20.

Figure 2:
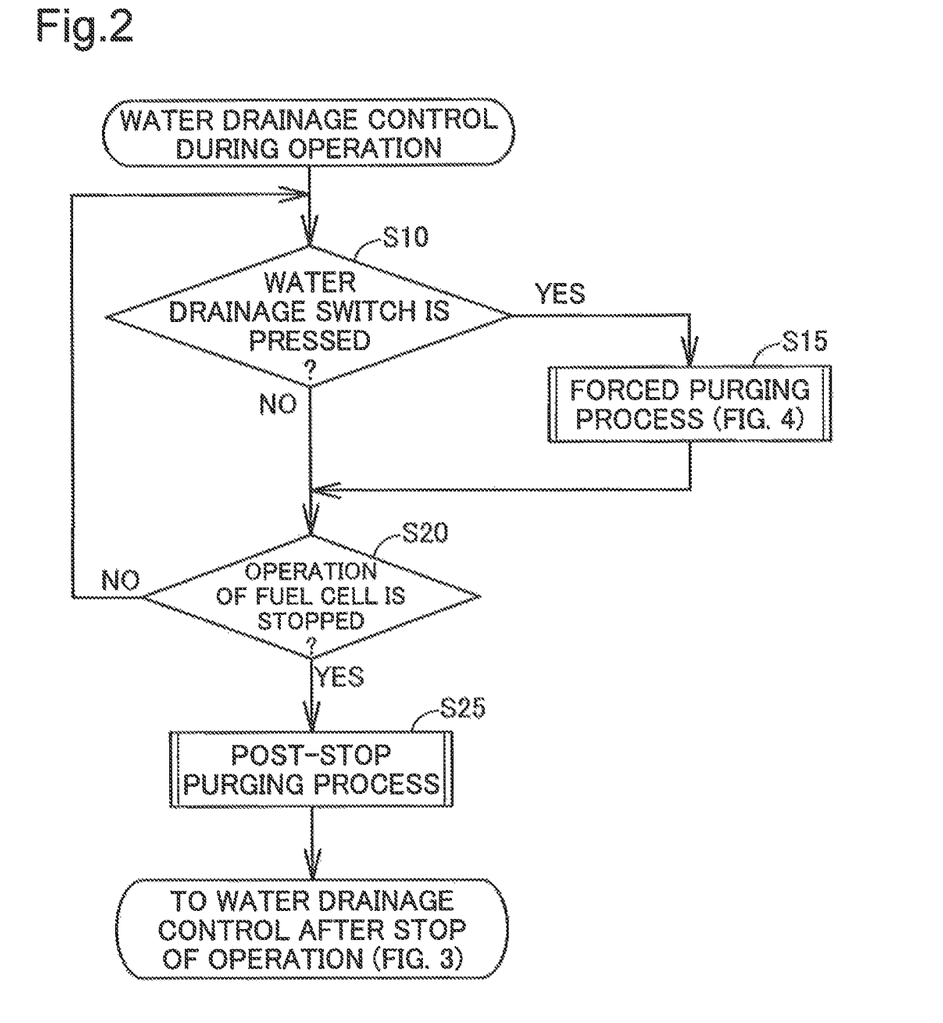
FIG. 2 is a flowchart showing a flow of water drainage control performed during operation of a fuel cell.

FIG. 2 is a flowchart showing a flow of water drainage control performed by the water drainage processor 16 during operation of the fuel cell 20. At step S10, the water drainage processor 16 detects whether the water drainage switch 11 is pressed. When detecting the driver's press of the water drainage switch 11 during operation of the fuel cell 20, as shown by YES arrow of step S10, the water drainage processor 16 performs a forced purging process as the water drainage process at step S15.

In the forced purging process, the cathode gas supply system 30 is controlled to perform the purge process to drain water inside of the fuel cell 20 and water in the fuel cell system 100 to outside. The series of processing of the forced purging process will be described later in detail. The forced purging process may be performed during a run of the fuel cell vehicle. In this case, power generation by the fuel cell 20 is temporarily stopped, and the forced purging process is performed with a change to a drive mode using the electric power of the secondary battery as the driving force.

In the fuel cell system 100 of the embodiment, for example, when the driver performs an ignition-off operation to stop the fuel cell vehicle, the controller 15 stops the operation of the fuel cell 20. More specifically, the controller 15 stops the supply of the reactive gases to the fuel cell 20 by the cathode gas supply system 30 and the anode gas supply system 50. When detecting stop of operation of the fuel cell 20 at step S20, the water drainage processor 16 performs a post-stop purging process as the water drainage process at step S25.

In the post-stop purging process, the cathode gas supply system 30 is controlled to perform the purge process to drain water inside of the fuel cell 20 and water in the fuel cell system 100 to outside. Such water drainage reduces the water content in the fuel cell system 100 after stop of operation of the fuel cell 20. This suppresses deterioration of the startability of the fuel cell system 100 due to freezing in a low temperature environment such as subzero environment and deterioration of components due to the remaining water content.

Figure 3:
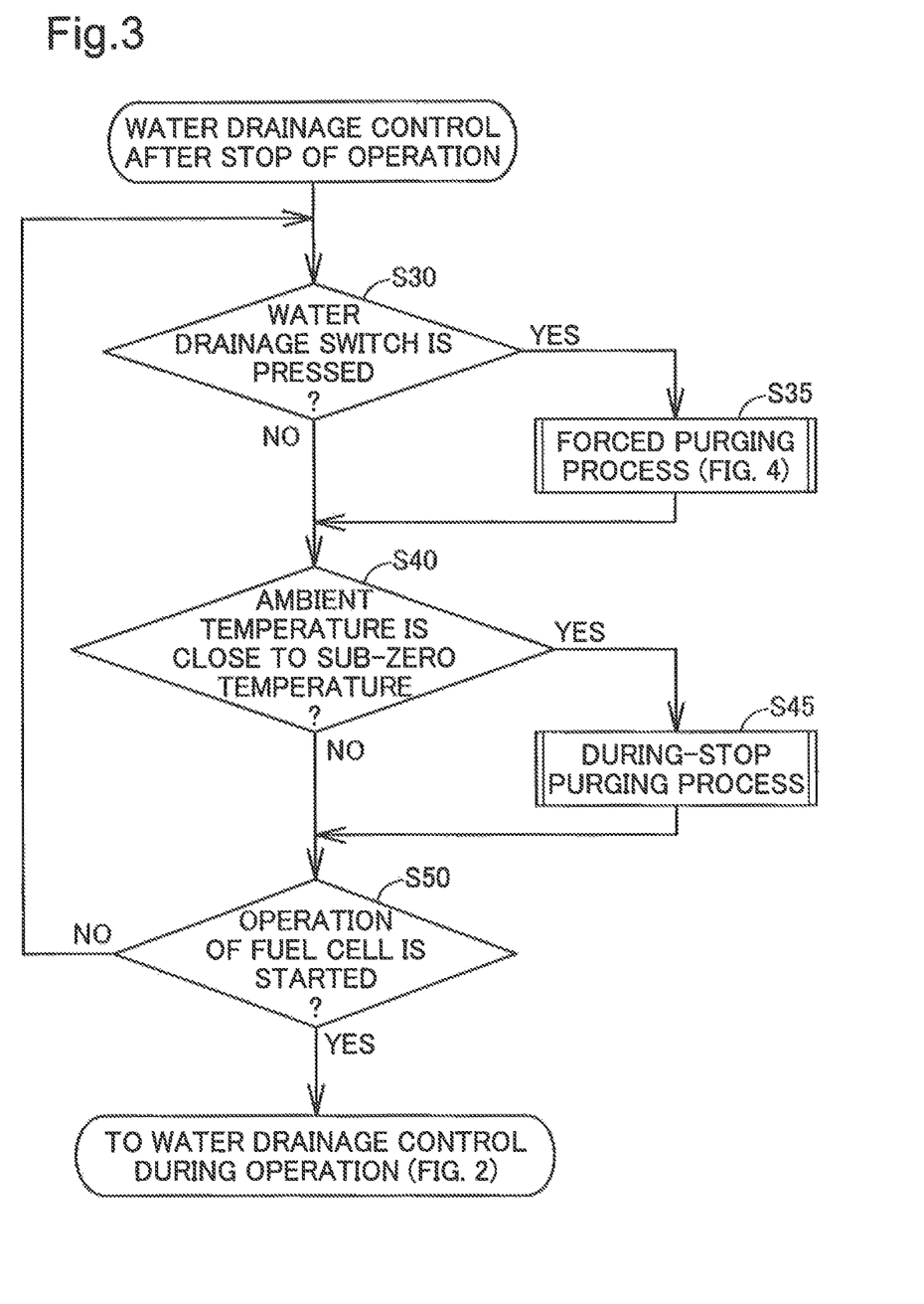
FIG. 3 is a flowchart showing a flow of water drainage control performed after stop of operation of the fuel cell.

FIG. 3 is a flowchart showing a flow of water drainage control performed by the water drainage processor 16 after stop of operation of the fuel cell 20. When detecting the driver's press of the water drainage switch 11 after stop of operation of the fuel cell 20 at step S30, the water drainage processor 16 performs the forced purging process as the water drainage process at step S35. The water drainage processor 16 activates the ambient temperature sensor 80 at regular intervals to obtain the ambient temperature after stop of operation of the fuel cell 20. When detecting that the obtained ambient temperature is in a predetermined temperature range close to the subzero temperature, for example temperature of 0 to 5° C., at step S40, the water drainage processor 16 performs a during-stop purging process as the water drainage process at step S45.

In the during-stop purging process, the cathode gas supply system 30 is controlled to perform the purge process to drain water inside of the fuel cell 20 and water in the fuel cell system 100 to outside. Performing the during-stop purging process in addition to the post-stop purging process further reduces the water content in the fuel cell 20. This more effectively suppresses deterioration of the startability of the fuel cell system 100 due to freezing. When the driver performs an ignition-on operation to start the fuel cell system 100 and start operation of the fuel cell 20 in S50, the water drainage processor 16 shifts to the water drainage control during operation of the fuel cell 20 shown in FIG. 2.

As described above, the fuel cell system 100 of the embodiment allows the driver to perform the forced purging process shown as step S15 in FIG. 2 or step S35 in FIG. 3, at any timing, prior to the post-stop purging process shown as step S25 in FIG. 2 or the during-stop purging process shown as step S45 in FIG. 3. In other words, the fuel cell system 100 of the embodiment allows the driver to arbitrarily select the location and the timing of performing the water drainage process. The driver performs the forced purging process in advance to reduce the water content in the fuel cell 20. This prevents potential trouble, i.e., splash of water drained from the fuel cell 20 at a stop or during a stop of the fuel cell vehicle.

In general, for the purpose of maintenance of the fuel cell vehicle or during a long-term parking of the fuel cell vehicle, the secondary battery may be disconnected or may have an insufficient state of charge. In such cases, the during-stop purging process is likely to be unexecutable. When such a situation is expected, the fuel cell system 100 of the embodiment allows the driver to perform the forced purging process in advance so as to reduce the water content in the fuel cell 20. This accordingly prevents deterioration of the startability of the fuel cell 20 due to freezing of the water content in a low temperature environment.

Figure 4:
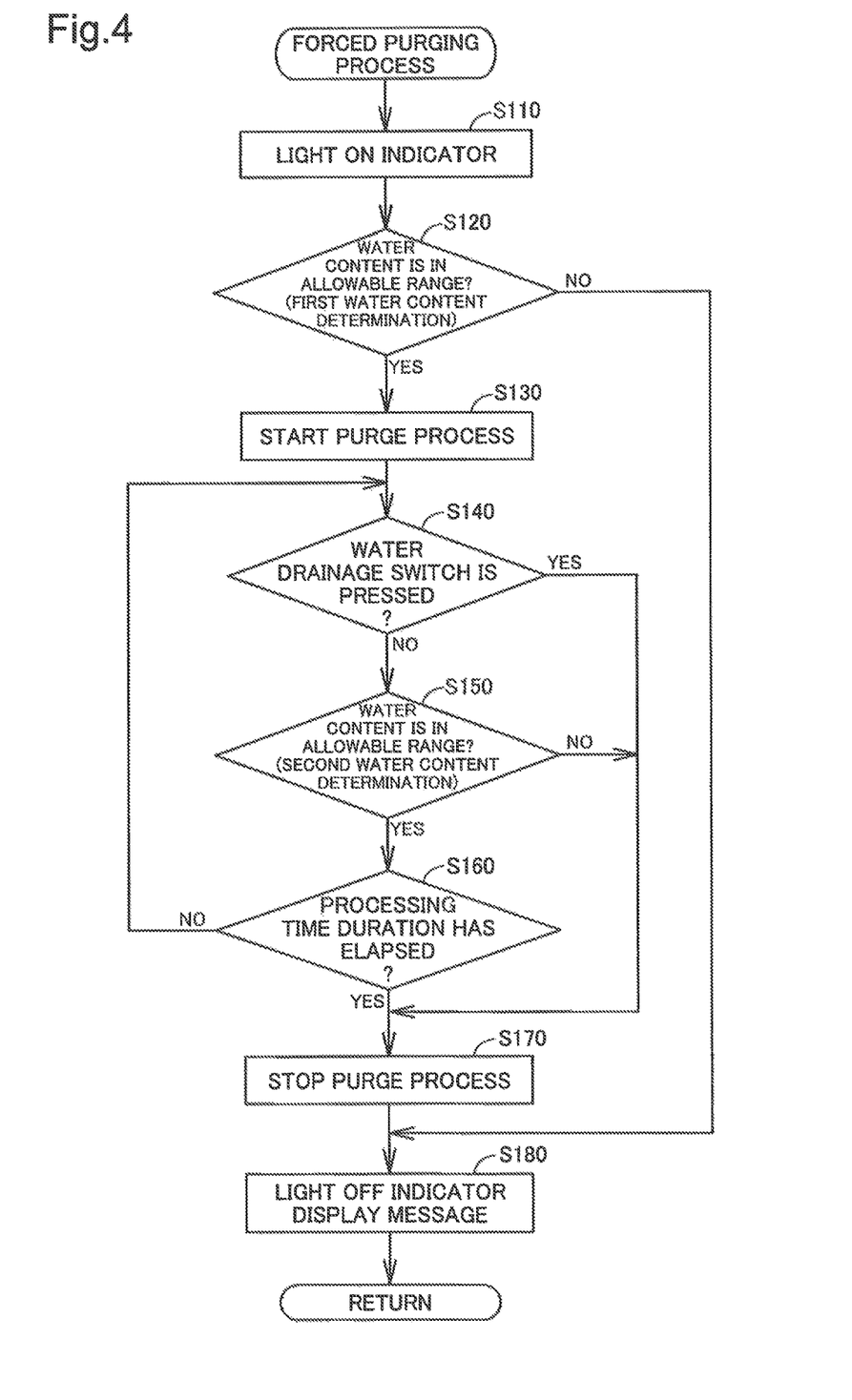
FIG. 4 is a flowchart showing a flow of forced purging process.

FIG. 4 is a flowchart showing a flow of the forced purging process performed by the water drainage processor 16. At step S110, the water drainage processor 16 lights on the indicator 12*a* of the water drainage notifier 12 to notify the driver of detection of the driver's press of the water drainage switch 11 and start of the water drainage process. At step S120, the water drainage processor 16 performs determination with regard to the water content in the fuel cell 20 as a first water content determination. More specifically, the water drainage processor 16 obtains a measurement value of the current water content in the fuel cell 20 from the water content detector 18. When it is determined at step S120 that the water content of the fuel cell 20 is equal to or higher than a predetermined threshold value and is in a predefined allowable range, the water drainage processor 16 controls the cathode gas supply system 30 to start the purge process at step S130. The water drainage processor 16 then starts counting the processing time duration of the purge process.

When it is determined at step S120 that the water content in the fuel cell 20 is lower than the predetermined threshold value and is out of the predefined allowable range, the water drainage processor 16 invalidates the driver's water drainage command and terminates the forced purging process without controlling the cathode gas supply system 30 to perform the purge process. The water drainage processor 16 then lights off the indicator 12*a* that is lit on at step S110, so as to indicate non-execution of the water drainage process or termination of the water drainage process at step S180. The water drainage processor 16 may display a message indicating that the water drainage process is unexecutable or that there is no need to perform the water drainage process, on the display unit 12*b*.

As described, in the fuel cell system 100 of the embodiment, the forced purging process is not performed in the state of insufficient water content in the fuel cell 20. This suppresses the fuel cell 20 from being excessively dried and thereby suppresses deterioration of the power generation performance of the fuel cell 20. The water drainage control after stop of operation of the fuel cell 20 is performed after execution of the post-stop purging process. Accordingly the determination of the water content at step S120 may be omitted.

When detecting the driver's repress of the water drainage switch 11 after start of the purge process by the cathode gas supply system 30, as shown YES arrow in step S140, the water drainage processor 16 controls the cathode gas supply system 30 to interrupt and stop the purge process at step S170. At step S180, the water drainage switch 11 then lights off the indicator 12*a* that is lit on at step S110. In the fuel cell system 100 of this embodiment, in this case, the driver is notified of interruption of the water drainage process by lighting off the indicator 12*a* without any message on the display unit 12*b*. According to a modification, the water drainage processor 16 may display a message indicating that the water drainage process is interrupted or a message indicating that the water drainage process is terminated, on the display unit 12*b*. This more effectively notifies the driver of interruption and stop of the forced purging process.

As described above, the fuel cell system 100 of the embodiment enables the water drainage process to be interrupted at any timing in the case where the driver unintentionally starts the water drainage process. The operation of interrupting the water drainage process is also a press of the water drainage switch 11, like the operation of starting the water drainage process. This allows the driver to cancel the water drainage process by an intuitive operation. This configuration allows the driver to cancel the water drainage process by the driver's simple and quick operation.

The water drainage processor 16 performs determination with regard to the water content in the fuel cell 20 as a second water content determination at step S150 during the purge process performed by the cathode gas supply system 30. When detecting that the water content in the fuel cell 20 becomes equal to or lower than a predetermined threshold value and is out of a predefined allowable range, as shown by NO arrow in step S150, the water drainage processor 16 controls the cathode gas supply system 30 to interrupt and stop the purge process at step S170. The water drainage processor 16 then lights off the indicator 12*a* that is lit on at step S110 and displays a message that the water drainage process is terminated, on the display unit 12*b* at step S180.

This suppresses useless continuation of the water drainage process in the dry state that the fuel cell 20 has a low water content. The threshold value in the second water content determination at step S150 may be different from the threshold value in the first water content determination at step S120. Like the forced purging process, the post-stop purging process or the during-stop purging process may perform determination similar to the second water content determination during the purge process, in order to determine the timing of terminating the purge process according to the water content in the fuel cell 20.

In the case where the purge process is not stopped based on the determination results of steps S140 and S150, the water drainage processor 16 controls the cathode gas supply system 30 to stop the purge process after elapse of a predetermined processing time duration, for example about several ten seconds to several minutes, at step S160 and S170. The water drainage processor 16 lights off the indicator 12*a* that is lit on at step S110 and displays a message indicating that the water drainage process is completed, on the display unit 12*b* at step S180.

Figure 5:
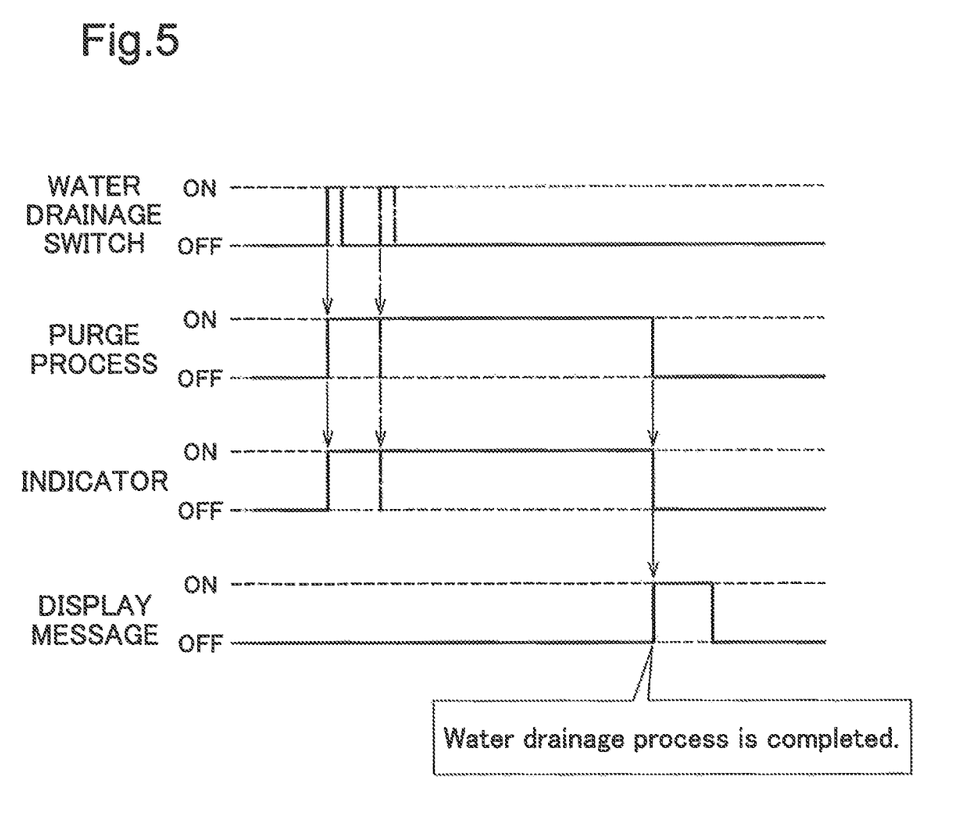
FIG. 5 is a timing chart showing a notification process performed by a water drainage notifier.
Figure 6:
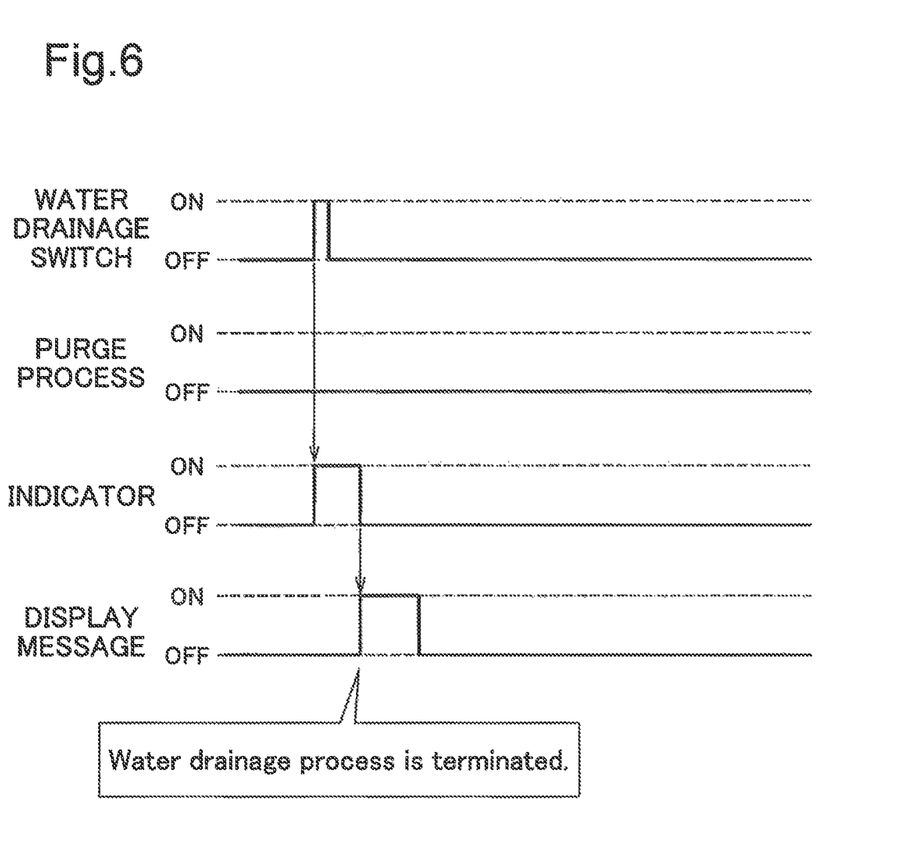
FIG. 6 is a timing chart showing the notification process performed by the water drainage notifier.

With reference to the timing charts of FIGS. 5 and 6, the following describes the notification process performed by the water drainage notifier 12 in the forced purging process. FIGS. 5 and 6 show the operation timings of the water drainage switch 11, the start and stop timings of the purge process, the timings of lighting on and lighting off the indicator 12*a* in the water drainage notifier 12, and the timings of displaying and eliminating a message on the display unit 12*b*. The solid-line graphs in FIG. 5 show the case where the water content of the fuel cell 20 reaches the predetermined threshold value at step S150. The one-dot chain line graphs in FIG. 5 show the case where the purge process is interrupted at step S140. FIG. 6 shows the case where the water drainage command is invalidated at step S120.

As shown by the solid line graphs in FIG. 5, the indicator 12*a* of the water drainage notifier 12 is kept on during a time period from the driver's press of the water drainage switch 11 to termination of the forced purging process. This allows the driver to visually recognize that the water drainage process started by the driver's operation continues. When the forced purging process is normally terminated, a message indicating that the forced purging process is completed is displayed on the display unit 12*b*. As shown by the one-dot chain line in FIG. 5, when the driver represses the water drainage switch 11 to interrupt the purge process, on the other hand, the indicator 12*a* is lit off without any message on the display unit 12*b*.

As shown in FIG. 6, when the water content in the fuel cell 20 is out of the allowable range and the command of performing the forced purging process is invalidated, the indicator 12a of the water drainage notifier 12 is lit on for only a short time period and is then lit off. This notifies the driver of that the driver's operation to give a command for starting the water drainage process is received but is invalidated. After the indicator 12a is lit off, a message that the water drainage process is terminated is displayed on the display unit 12b. Instead of the message that the water drainage process is terminated, a message that the fuel cell 20 has a low water content and that there is no need to perform the water drainage process may be displayed on the display unit 12b. This notifies the driver of the reason why the water drainage command is invalidated.

A3. Advantageous Effects of First Embodiment

As described above, the fuel cell system 100 of the embodiment allows the driver to arbitrarily select the timing of performing the water drainage process by operating the water drainage switch 11. This accordingly prevents potential trouble, i.e., water splash, caused by the water drainage process. In the state of insufficient water content in the fuel cell 20, the forced purging process is not allowed to be performed. This suppresses inside of the fuel cell 20 from being excessively dried by the water drainage process. The forced purging process is terminated according to the water content in the fuel cell 20. This suppresses useless continuation of the purge process and reduction of the system efficiency. Additionally, the water drainage notifier 12 notifies the driver of the execution state of the water drainage process. This ensures the high usability.

B. Second Embodiment

Figure 7:
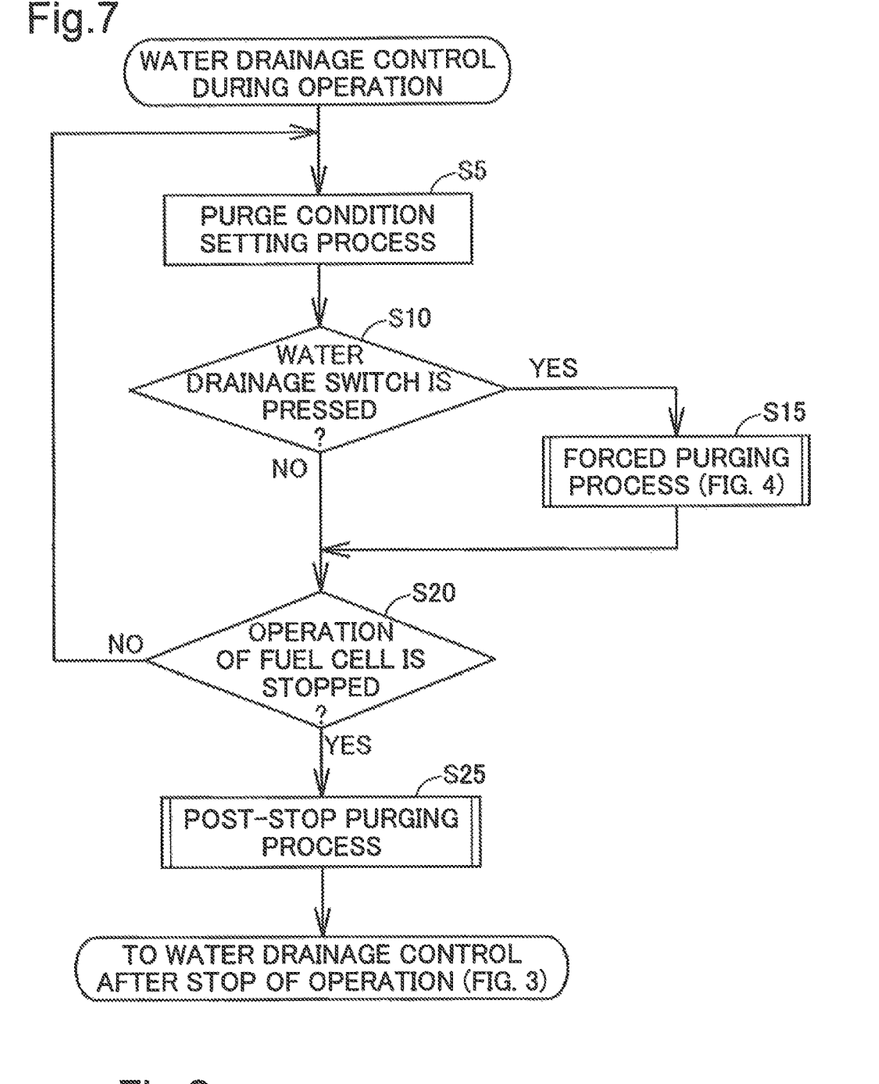
FIG. 7 is a flowchart showing a flow of water drainage control according to a second embodiment.

FIG. 7 is a flowchart showing a flow of water drainage control performed in a fuel cell system according to a second embodiment of the present invention. The fuel cell system of the second embodiment has a substantially similar configuration to that of the fuel cell system 100 of the first embodiment shown in FIG. 1. The fuel cell system of the second embodiment performs a different flow of water drainage control during operation of the fuel cell 20, but otherwise performs the same water drainage control as that of the first embodiment. In the fuel cell system of the second embodiment, the water drainage processor 16 performs a purge condition setting process in the flow of water drainage control during operation of the fuel cell 20 at step S5.

In the purge condition setting process, the water drainage processor 16 sets the condition of the purge process performed as the water drainage process according to the environment information regarding the environment in which the fuel cell 20 is placed. The water drainage processor 16 obtains the ambient temperature from the ambient temperature sensor 80 as the environment information regarding the environment in which the fuel cell 20 is placed and changes the processing condition of the post-stop purging process at step S25 and the processing condition of the forced purging process at step S35. The processing condition of the post-stop purging process is changed to increase at least one of the flow rate of purge gas and the processing time duration of the purge process, in order to increase the amount of water drainage with a decrease in ambient temperature. This more effectively suppresses deterioration of the startability of the fuel cell 20 due to freezing in a low temperature environment. This also reduces the amount of energy consumption by the water drainage process in a temperature environment that there is little need to prevent water freezing in the fuel cell system 100.

Figure 8:
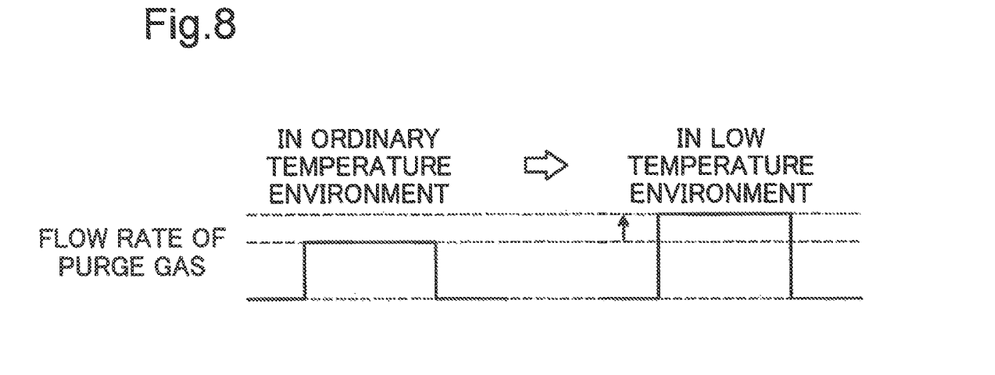
FIG. 8 is a diagram illustrating changing the processing condition of the forced purging process.
Figure 9:
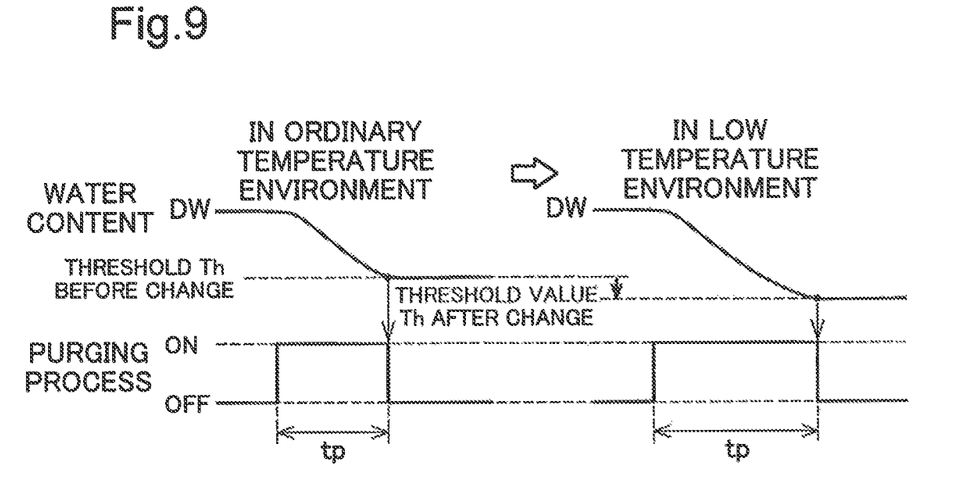
FIG. 9 is a diagram illustrating changing the processing condition of the forced purging process.

FIGS. 8 and 9 are diagrams illustrating changing the processing condition of the forced purging process. The left-side graph of FIG. 8 shows a variation in flow rate of the purge gas when the ambient temperature is ordinary temperature, as such about 10° C. to 30° C., and the right-side graph of FIG. 8 shows a variation in flow rate of the purge gas when the ambient temperature is low temperature, as such about −10° C. to 10° C. The left-side timing chart of FIG. 9 shows the purge process when the ambient temperature is ordinary temperature, and the right-side timing chart of FIG. 9 shows the purge process when the ambient temperature is low temperature.

The water drainage processor 16 changes the processing condition of the forced purging process to increase the amount of water drainage with a decrease in ambient temperature, like the processing condition of the post-stop purging process. More specifically, the water drainage processor 16 increases the flow rate of purge gas in the forced purging process with a decrease in ambient temperature. Alternatively the water drainage process 16 decreases a threshold value Th of water content DW in the fuel cell 20 to terminate the forced purging process as shown in FIG. 9. This increases a purge time duration tp in the forced purging process and thereby increases the amount of water drainage with a decrease in ambient temperature at a fixed flow rate of purge gas. According to one modification, the water drainage processor 16 may change both the flow rate of purge gas and the threshold value Th of water content DW in the fuel cell 20.

As described above, in the fuel cell system of the second embodiment, the processing condition of the post-stop purging process is changed according to the environment condition in which the fuel cell 20 is placed. This more effectively suppresses deterioration of the startability of the fuel cell 20 due to freezing in the low temperature environment. The processing condition of the forced purging process is changed to increase the amount of water drainage with a decrease in ambient temperature, like the processing condition of the post-stop purging process. Accordingly, this suppresses the forced purging process with the changed processing condition from reducing the effect of preventing potential trouble, i.e., water splash during the post-stop purging process.

C. Modifications

C1. Modification 1

In each of the above embodiments, the water drainage switch 11 is provided in the form of a push button switch in the instrument panel. The water drainage switch 11 may be provided in the form of a button icon on a touch panel in the instrument panel or may be provided in the form of a lever switch. The water drainage switch 11 may be provided on the side of the driver's seat or may be provided in the form of a foot pedal. The water drainage processor 16 may receive the driver's voice command of water drainage, instead of the driver's operation of the water drainage switch 11. The water drainage processor 16 may detect the driver's water drainage command when an operation unit configured to receive an operation other than the operation for the water drainage process is operated in a predetermined pattern. For example, the water drainage processor 16 may detect the driver's water drainage command when a hazard switch is continually pressed three times during a short time period.

C2. Modification 2

In each of the above embodiments, the water drainage notifier 12 uses the indicator 12a and the display unit 12b to notify the driver of the information regarding the water drainage process. The water drainage notifier 12 may employ means other than the indicator 12a and the display unit 12b to notify the driver of the information regarding the water drainage process. For example, the water drainage notifier 12 may employ a speaker to notify the driver of oral information regarding the water drainage process.

C3. Modification 3

In each of the above embodiments, the water drainage processor 16 invalidates the driver's water drainage command when the first water content determination determines that the water content in the fuel cell 20 is out of the allowable range. According to a modification, the water drainage processor 16 may not invalidate the driver's water drainage command. When the first water content determination determines that the water content in the fuel cell 20 is out of the allowable range, the water drainage processor 16 may change the processing condition of the forced purging process to reduce the amount of water drained by the forced purging process. The processing condition of the forced purging process includes, for example, the flow rate of purge gas, the threshold value of the water content and the time duration of purge process as described in the above embodiments. The water drainage processor 16 may change the processing condition of the forced purging process according to the water content in the fuel cell 20 prior to the forced purging process without performing the first water content determination.

C4. Modification 4

In each of the above embodiments, the water drainage processor 16 performs the forced purging process, the post-stop purging process and the during-stop purging process as the water drainage process in the water drainage control. The water drainage processor 16 should perform at least the forced purging process as the water drainage process in the water drainage control and may omit the post-stop purging process and the during-stop purging process. Even in a configuration without performing the post-stop purging process and the during-stop purging process, the driver may perform the forced purging process that is executable at any timing, in order to prevent potential trouble, i.e., water splash, caused by the water drainage process, freezing of the fuel cell 20 in the low temperature environment and deterioration of components in the fuel cell system caused by the remaining water content.

C5. Modification 5

In each of the above embodiments, the water content detector 18 obtains the estimated value of the water content in the fuel cell 20, based on the measurement value of the impedance measurement unit 81. According to a modification, the water content detector 18 may obtain the estimated value of the water content in the fuel cell 20 by another means. For example, the water content detector 18 may obtain the estimated value of the water content in the fuel cell 20, based on an operation record of the fuel cell 20, for example, the output current of the fuel cell 20, the flow rate of the reactive gas supplied to the fuel cell 20 and the amount of water discharged from the fuel cell 20.

C6. Modification 6

In each of the purging processes in the fuel cell system of each of the above embodiments, the cathode gas supply system 30 performs the purge process in the fuel cell 20. According to a modification, in each of the purging processes in the fuel cell system of the above embodiment, the anode gas supply system 50 may perform the purge process, in addition to or in place of the purge process performed by the cathode gas supply system 30. In the purge process performed by the anode gas supply system 50, the water drainage processor 16 may actuate the hydrogen circulation pump 64 with stopping the supply of hydrogen from the hydrogen tank 52 to circulate the remaining gas in the fuel cell 20 through the anode off-gas piping 61 and the anode gas circulation piping 63. The water drainage processor 16 may subsequently open the drainage valve 66 at predetermined cycles to drain water. In each of the purging processes in the fuel cell system of the above embodiment, a purge gas supply system may be provided separately from the cathode gas supply system 30 and the anode gas supply system 50 to supply the purge gas to the fuel cell 20 and perform the purge process.

C7. Modification 7

In the second embodiment described above, the water drainage processor 16 obtains the ambient temperature from the ambient temperature sensor 80 as the environment information regarding the environment in which the fuel cell 20 is placed. According to a modification, the water drainage processor 16 may obtain information other than the ambient temperature as the environment information of the fuel cell 20. For example, the water drainage processor 16 may obtain date information and specify the current season as the environment information of the fuel cell 20. In this example, the water drainage processor 16 may change the processing condition of the forced purging process and the processing condition of the post-stop purging process according to the season. More specifically, the water drainage processor 16 may change the processing condition of the forced purging process and the processing condition of the post-stop purging process to achieve the greater amount of water drainage in the season having the lower environment temperature. In another example, the water drainage processor 16 may obtain location information representing the current location of the fuel cell vehicle from a GPS satellite as the environment information of the fuel cell 20. In this example, the water drainage processor 16 may change the processing condition of the forced purging process and the processing condition of the post-stop purging process to achieve the greater amount of water drainage at the higher altitude of the current location of the fuel cell vehicle.

C8. Modification 8

In the fuel cell system of each of the above embodiments, another press of the water drainage switch 11 after a press of the water drainage switch 11 cancels the forced purging process. According to a modification, the fuel cell system may include an operation unit other than the water drainage switch 11 to cancel the forced purging process.

C9. Modification 9

The fuel cell system of each of the above embodiments is mounted on the fuel cell vehicle. The fuel cell system of each of the above embodiments may alternatively be mounted on a moving body other than the fuel cell vehicle, for example train, ship or boat or aircraft. The fuel cell system of each of the above embodiments may not be necessarily mounted on the moving body but may be incorporated in a building or a facility.

C10. Modification 10

The fuel cell system of each of the above embodiments may be regarded as a system including a water drainage device for fuel cell which comprises the cathode gas supply system 30 configured to perform the purge process of supplying the purge gas to the fuel cell 20; the water drainage switch 11 configured to receive a water drainage command from the user; and the controller 15 configured to control the cathode gas supply system 30 to perform the purge process when receiving the user's water drainage command. The water drainage device of the present invention is not limited to the configuration incorporated along with the fuel cell in the fuel cell system but may be configured as a stand-alone device to be connectable with the fuel cell.

C11. Modification 11

The fuel cell system of each of the above embodiments may be regarded as a system including a water drainage device for fuel cell having the following configuration. This water drainage device for fuel cell may be provided to drain water from inside of a fuel cell and comprise a purge gas supply system that is configured to supply a gas for purging out water from inside of the fuel cell, to the fuel cell; an operation unit that is configured to receive a water drainage command from a user to give an instruction of purging out the water from inside of the fuel cell; and a controller that is configured to control the purge gas supply system to perform a purge process of purging inside of the fuel cell when receiving the water drainage command via the operation unit. The water drainage device of this configuration allows water to be drained from inside of the fuel cell at any timing selected by the user. When there is a need to suppress water drainage from the fuel cell, the purge process may be performed in advance to reduce the water content inside of the fuel cell. This reduces the amount of water drained by a subsequent water drainage process.

The invention is not limited to any of the embodiments, the examples and the modifications described above but may be implemented by a diversity of other configurations without departing from the scope of the present invention. For example, the technical features of any of the embodiments, examples and modifications corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein. In any of the embodiments and the modifications, part or all of the functions or the processes implemented by software may be configured by hardware. Part or all of the functions or the processes implemented by hardware may be configured by software. The hardware may be any of various circuits, such as integrated circuit, discrete circuit or circuit module as combination of these circuits.

What is claimed is:

1. A control method of a fuel cell system, comprising:
a water drainage command receiving step that causes a processor to receive a water drainage command from a water drainage switch when the water drainage switch is operated;
a water drainage process performing step that causes the processor, when receiving the water drainage command, to control a purge gas supply system to start a purge process, wherein the purge process supplies a gas to the fuel cell for purging out water from inside of the fuel cell and thereby drain water from the fuel cell;
a water content obtaining step that causes the processor to obtain a water content representing an amount of water included in the fuel cell, when receiving the water drainage command; and
a water drainage process controlling step that causes the processor, when the obtained water content is equal to or lower than a predetermined value, to perform
a process of changing a processing condition of the purge process to decrease an amount of water drained by the purge process, compared with an amount of water drainage when the obtained water content is higher than the predetermined value, and starting the purge process according to the changed processing condition when the water drainage switch is operated.

2. The control method according to claim 1, further comprising
a water drainage process stopping step that causes the processor to terminate the purge process, when the water drainage switch is operated after starting the purge process in response to the water drainage command.

3. The control method according to claim 1, further comprising
a notifying step that causes the processor to notify a user of an execution state of the purge process via a notifier.

4. The control method according to claim 1, further comprising
an environment information obtaining step that causes the processor to obtain environment information regarding an environment condition in which the fuel cell is placed; and
a processing condition changing step that causes the processor to change a processing condition of the purge process according to the obtained environment information.

5. The control method according to claim 1,
wherein the water drainage process performing step comprises a forced purging process performing step that performs the purge process as a forced purging process,
the control method further comprising
a post-stop purging process performing step that causes the processor to control the purge gas supply system to perform a post-stop purging process of supplying the gas to the fuel cell and purging inside of the fuel cell, after stop of operation of the fuel cell.

6. The control method according to claim 5, further comprising:

an environment information obtaining step that causes the processor to obtain environment information regarding an environment condition in which the fuel cell is placed; and a processing condition changing step that causes the processor to change a processing condition of the forced purging process and a processing condition of the post-stop purging process according to the obtained environment information.

7. A water drainage device for fuel cell that drains water from inside of a fuel cell, comprising:

a processor configured to perform the control method of claim 1;

the purge gas supply system, the purge gas supply system being configured to supply the gas to the fuel cell for purging out water from inside of the fuel cell;

an operation unit that is configured to receive the water drainage command from a user;

a water drainage controller that is configured to perform a purge process of purging inside of the fuel cell to drain water from the fuel cell by controlling the purge gas supply system, when receiving the water drainage command via the operation unit; and a water content acquirer that is configured to obtain the water content representing the amount of water included in the fuel cell, wherein when the obtained water content is equal to or lower than a predetermined value, the water drainage controller performs either one of:
  (i) a process of invalidating the water drainage command received by the operation unit; and
  (ii) the process of changing the processing condition of the purge process to decrease the amount of water drained by the purge process, compared with the amount of water drainage when the obtained water content is higher than the predetermined value.

8. The water drainage device according to claim 7, wherein the water drainage controller terminates the purge process, when receiving an operation that is identical with an operation to give the water drainage command via the operation unit during the purge process.

9. The water drainage device according to claim 7, further comprising
a notifier that is configured to notify the user of an execution state of the purge process.

10. The water drainage device according to claim 7, further comprising:

an environment information acquirer that is configured to obtain environment information regarding an environment condition in which the fuel cell is placed, wherein the water drainage controller changes a processing condition of the purge process according to the obtained environment information.

11. A fuel cell system comprising:

a fuel cell;

the water drainage device according to claim 7; and a system controller that is configured to control operation of the fuel cell and serve as the water drainage controller of the water drainage device, wherein the system controller controls the purge gas supply system to perform the purge process which is to be performed, when receiving the water drainage command via the operation unit, as a forced purging process; and the system controller controls the purge gas supply system to perform a post-stop purging process of purging inside of the fuel cell after stop of operation of the fuel cell, in addition to the forced purging process.

12. The fuel cell system according to claim 11, further comprising an environment information acquirer that is configured to obtain environment information regarding an environment condition in which the fuel cell is placed, wherein the system controller changes a processing condition of the forced purging process and a processing condition of the post-stop purging process according to the obtained environment information.

13. A moving body that comprises a fuel cell mounted thereon as an electric power source, the moving body being equipped with the fuel cell system according to claim 11 and a fuel gas tank.

* * * * *